(12) United States Patent
Tomlonovic et al.

(10) Patent No.: US 7,150,419 B1
(45) Date of Patent: Dec. 19, 2006

(54) TRAILER FRONT MOUNTED SPRAYERS

(75) Inventors: Vincent J. Tomlonovic, North Mankato, MN (US); Roger J. Scheurer, Kasota, MN (US); Richard L. Peterson, Lesueur, MN (US)

(73) Assignee: Hiniker Company, Mankato, MN (US)

( * ) Notice: Subject to any disclaimer, the term of this patent is extended or adjusted under 35 U.S.C. 154(b) by 192 days.

(21) Appl. No.: 10/912,686

(22) Filed: Aug. 5, 2004

Related U.S. Application Data (60) Provisional application No. 60/492,775, filed on Aug. 5, 2003.

(51) Int. Cl.
*B05B 3/00* (2006.01)
*B05B 3/18* (2006.01)

(52) U.S. Cl. ............... 239/722; 239/726; 239/728; 239/730; 239/731; 239/732

(58) Field of Classification Search ........ 239/722, 239/726, 728, 730, 731, 732, 739, 146, 147, 239/159–166
See application file for complete search history.

(56) References Cited

U.S. PATENT DOCUMENTS

| | | | | | |
|---|---|---|---|---|---|
| 4,595,140 | A | * | 6/1986 | Harden et al. | 239/167 |
| 4,946,102 | A | * | 8/1990 | DeWitt et al. | 239/167 |
| 5,348,226 | A | * | 9/1994 | Heiniger et al. | 239/1 |
| 5,927,606 | A | * | 7/1999 | Patterson | 239/167 |

\* cited by examiner

*Primary Examiner*—Davis Hwu
(74) *Attorney, Agent, or Firm*—Farris Law, P.C.; Robert L. Farris (57) ABSTRACT

The sprayer trailer has a trailer frame with a font end and a rear end. A pair of wheels are connected to the trailer frame. A hitch assembly includes a rear mast with a lower end connected to the trailer frame and a front mast with a front mast top end connected to a rear mast top end. A vertical guide assembly is mounted on the hitch assembly. A hitch connector assembly portion is mounted on a front mast lower end. A vertical guide assembly is mounted on the hitch assembly. A boom support frame is slidable on the vertical guide assembly. A sprayer boom center section is supported by the boom support frame. Nozzles on the boom center section move vertically between a lowered position below the rear mast and a raised position above the rear mast lower end.

8 Claims, 7 Drawing Sheets

TRAILER FRONT MOUNTED SPRAYERS

CROSS REFERENCE TO RELATED APPLICATION

This application claims the benefit of the filing date of U.S. Provisional Application No. 60/492,775, titled "TRAILER FRONT MOUNTED SPRAYERS", filed Aug. 5, 2003

BACKGROUND OF THE INVENTION

1. Field of the Invention

The agricultural sprayer for applying liquid herbicides, insecticides, and fertilizers to farm fields and crops growing in farm fields, includes a spray boom with a center section, a left wing and a right wing mounted on the front of a trailer with a hitch adapted to be connected to a tractor.

2. Prior Art

Agricultural sprayers are available that are mounted on a tractor as well as sprayers that are mounted on a trailer. The tractor mounted sprayers can include a tractor that is designed specifically for application of liquids. Such tractors are high clearance units that are generally not suitable for tillage or harvesting operations. Such tractors and integral sprayer units can spray a number of acres per hour. When tractors with integral sprayer units are not needed for spraying, they are idle. A farm must be relatively large to justify such a sprayer.

Tractor mounted sprayer attachments that mount directly on a tractor are also available. The tractors that carry such sprayer attachments are also useable for tillage or harvesting operations, when a portion or all of the sprayer attachment is removed. These units require time to convert to and from spray units. During the conversion they are not useable for spraying or any other function. They are out of commission. During use as sprayer units, they are less maneuverable than tractors with integral sprayers that are used for spraying only. They are also heavier then dedicated sprayer tractors and cause more soil compaction. Due to their increased weight, sprayer attachments mounted on conventional farm tractors also require more fuel per hour than an integral sprayer unit with the same capacity sprayer.

Trailer mounted sprayers include a trailer frame supported by two or more wheels journaled on one or more axles. A hitch assembly on the front of the trailer is adapted for connection to the draw bar of the tractor. A tank is mounted on the frame. A sprayer boom is mounted on the trailer frame. Pipes, with a plurality of spaced apart nozzles, are mounted on the sprayer boom. A pump and liquid metering valve is connected to the tank and to the pipes. The pump is driven by the tractor through a power take off shaft or through a hydraulic motor. Farm tractors used today in North America have power take off drive shafts that can drive a shaft connected to the sprayer pump as well as an internal hydraulic pump that can supply hydraulic fluid under pressure to a remote hydraulic motor connected to a sprayer pump mounted on the trailer frame.

The sprayer boom may spray a strip that is sixty (60) or more feet wide during each pass through a field. The boom, to spray such a strip, may include a short center boom section, a left wing assembly and a right wing assembly. Each wing assembly includes an inner wing section pivotally attached to the trailer frame and one or more outer wings pivotally attached to the inner wing section. Hydraulic cylinders are provided for folding both wing assemblies to a transport position. A boom vertical lift assembly permits the elevation of the nozzles to be adjusted to a position between about eighteen inches (18") above the ground and a position about fifty inches (50") above the ground. A self-leveling assembly of some type permits one trailer wheel to move up over a rock and down and across a furrow without moving outer ends of the boom vertically a significant distance.

A center boom section as well as the left and right wing assemblies are mounted on the rear of the trailer-frame on some sprayers. In this position to the rear of the trailer axle, movement of the trailer wheels up and over a six inch (6") high ridge will pivot the trailer about the connection to the tractor and raise the boom upward more than six inches (6"). Movement of both trailer wheels across a six inch (6") deep furrow will lower the boom more then six inches (6"). Vertical movement of the tractor will also move the boom at the rear of the trailer in the opposite direction from the vertical movement of the tractor rear wheels. Vertical movement of the boom places large forces on the sprayer boom and the trailer frame and makes it necessary to reduce tractor speed if the field to be sprayed is rough. Reduction of tractor speed reduces productivity, thereby increasing the per acre cost of spraying.

The left wing assembly and the right wing assembly on some trailer sprayers have been moved forward to a position near the front of the liquid storage tank. In the forward position, both wing assemblies are midway between the tractor rear wheels and the trailer wheels. In this position, passage of the trailer wheels up over a six inch (6") ridge will raise the boom only about 3 inches (3"). Passage of the trailer wheels across a six inch (6") deep furrow will lower the boom assemblies about 3 inches (3"). Movement of the tractor rear wheels vertically will also move the boom wing assemblies about half the vertical distance moved by the tractor wheels. Mounting the boom wing assemblies forward of the liquid storage tank reduces vertical wing assembly movement, thereby substantially reducing loads on wing booms and the trailer frame. Some manufacturers of trailer mounted sprayers have moved the wing assemblies forward while leaving the boom center section at the rear of the trailer. They could not move the boom center section forward because the trailer frame interferes with vertical boom adjustment. This arrangement works reasonably well on relatively flat fields. A field that has terraces generally requires the tractor to move in an arcuate path parallel to the terrace. When following an arcuate path, the center boom on the rear of the trailer will overlap one wing boom nozzle and leave an untreated strip between the other wing boom nozzle and the center boom. The overlapping spray may provide excessive spray and damage crops. The missed strip may, for example, leave a narrow strip of weeds that are not killed by an herbicide. A few weeds that go to seed can result in seeding most of a field. A few insects that escape an insecticide can damage an entire crop.

SUMMARY OF THE INVENTION

The hitch assembly includes a vertical mast that is welded to the frame of the sprayer trailer and extends upward from the frame. A horizontal frame of the hitch assembly is connected to the top of the mast and extends forward from the mast. A V-frame member has legs with their free ends welded to a forward end of the horizontal frame. The bottom of the V-frame member is below and forward of the horizontal frame member. A hitch member for attaching the trailer to a tractor drawbar is mounted on the bottom of the V-frame member. The hitch assembly as described above provides an unobstructed area from the horizontal frame of the hitch assembly to, the ground and from the vertical mast to the A-frame member. A spray boom center section is supported in the unobstructed area where it can be moved vertically between a position close to the ground and a raised position above most crops that would be sprayed by a sprayer pulled by a tractor.

BRIEF DESCRIPTION OF THE DRAWINGS

These and other objects, features and advantages will become more readily apparent in view of the following detailed description and best mode, appended claims and accompanying drawings, in which:

DESCRIPTION OF THE PREFERRED EMBODIMENTS

The sprayer trailer 10 with a front mounted sprayer boom 12 includes a trailer frame 14 supported by tires 16 on wheels 18. The frame 14 includes two parallel spaced apart frame members 22 and 24. A hitch assembly 20 includes a vertical mast 26 welded to the frame members 22 and 24, and extending upward from the frame members. The vertical mast 26 is a vertical rear mast of the hitch assembly 20. A horizontal frame portion 28 of the hitch assembly 20 extends forward from the top of the mast 26. A V-frame member 30 has its legs welded to the front of the horizontal frame portion 28 and extends downward and forward from the horizontal frame. The bottom of the V-frame member 30 is adapted to be connected to the draw bar of the tractor 32. The V-frame member 30 is a forward or front mast of the hitch assembly 20. The horizontal frame member 28 is around eight feet (8') above the ground.

A spray storage tank 34 is mounted on and supported by the frame members 22 and 24. A lid 36 on the spray fluid tank 34 is opened to fill the tank. A foam storage tank 38 is mounted on the frame members 22 and 24 to the rear of the spray fluid storage tank 34. Foam from the storage tank 38 marks a field to indicate where the next pass through the field is to be made and to ensure that a portion is not missed. Pumps and control valves 40, for the spray fluid and the foam, are mounted on the frame 14.

Figure 1:
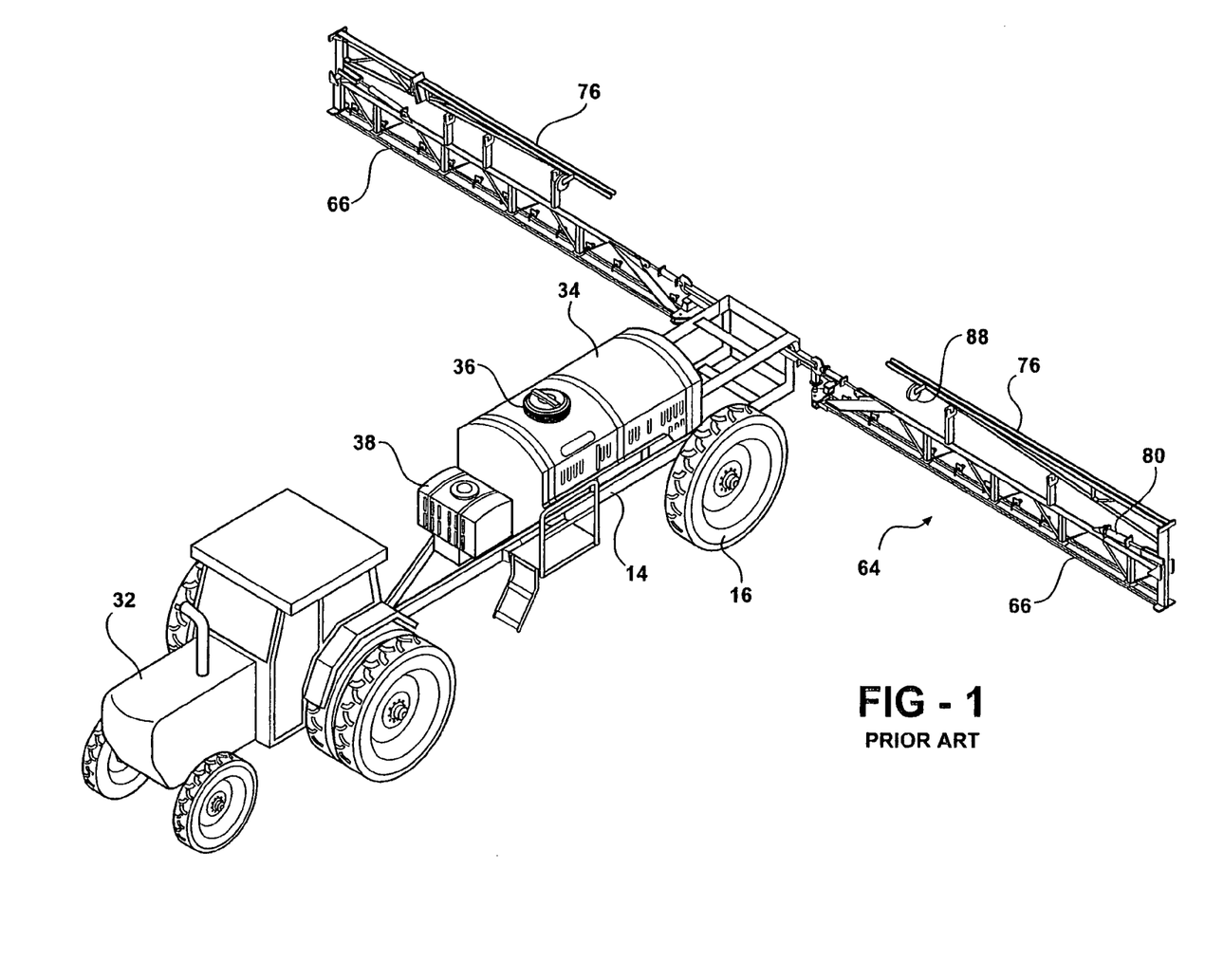
FIG. 1 is a perspective view of a prior art sprayer trailer, with a rear mounted boom, attached to a farm tractor.
Figure 2:
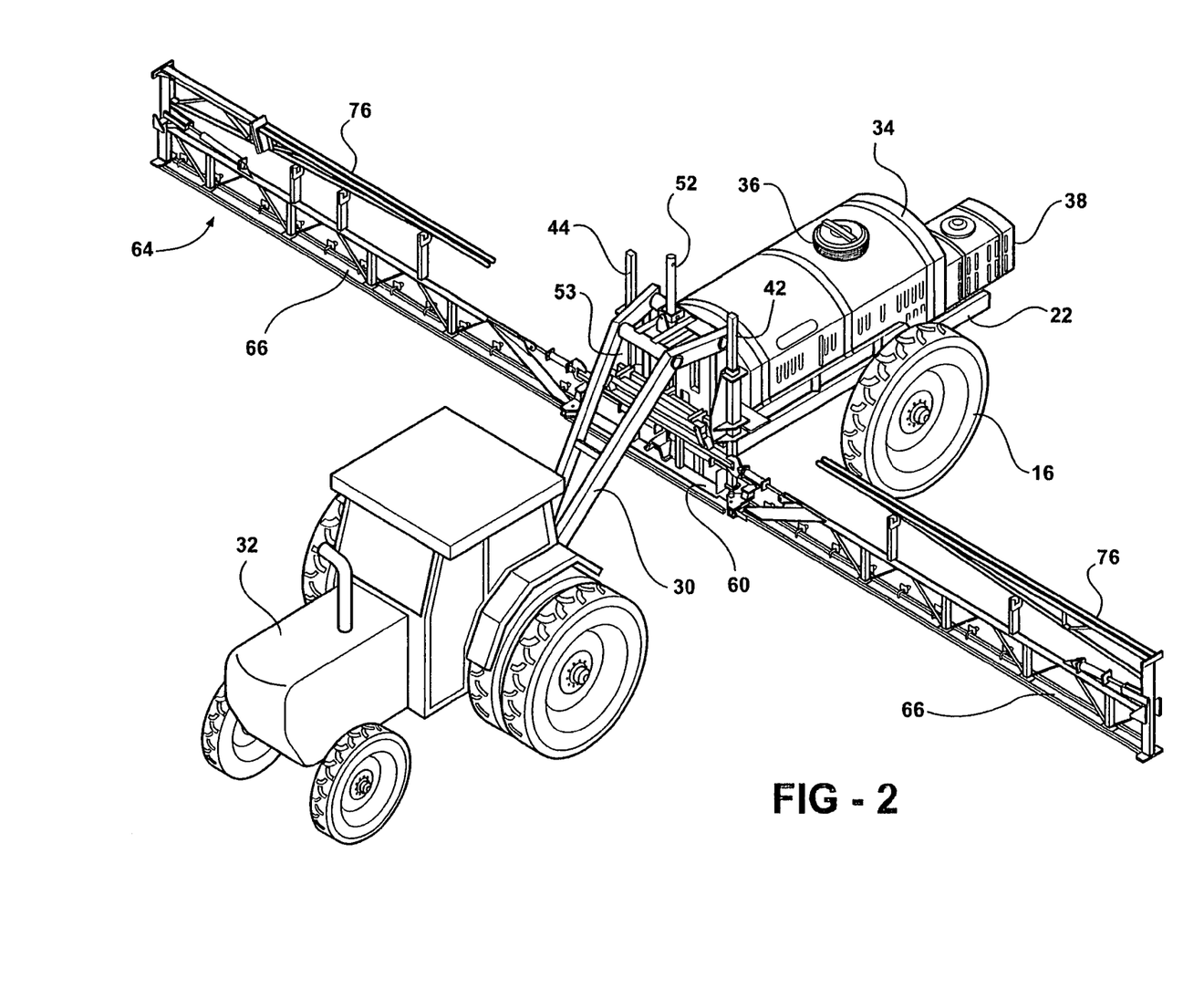
FIG. 2 is a perspective view of a sprayer trailer with a front mounted boom including a center boom section, left wing assembly, and right wing assembly.
Figure 3:
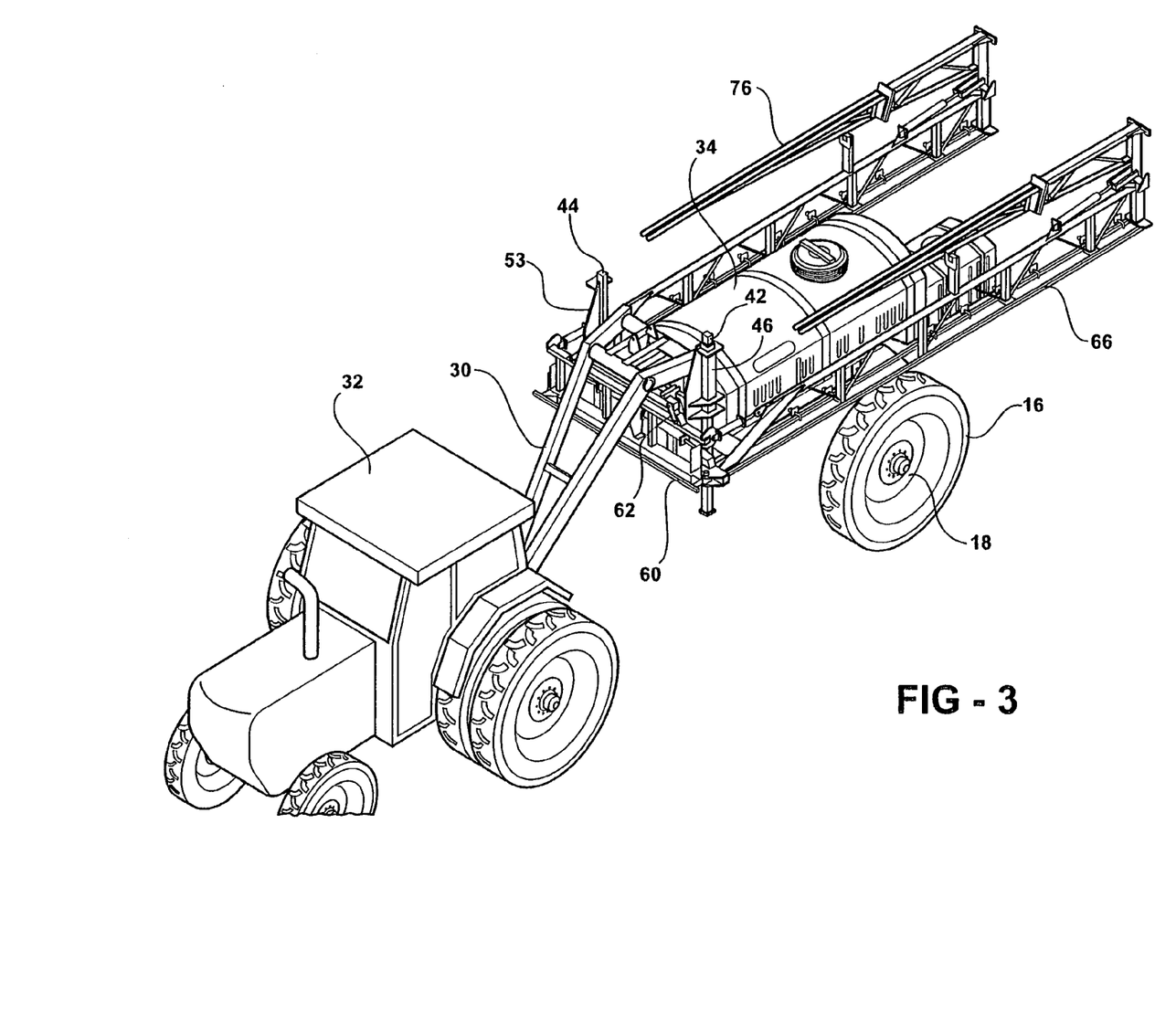
FIG. 3 is a perspective view of a sprayer trailer with a front mounted boom including a center boom section and pivotally attached left and right wing assemblies that are in a folded transport position.
Figure 4:
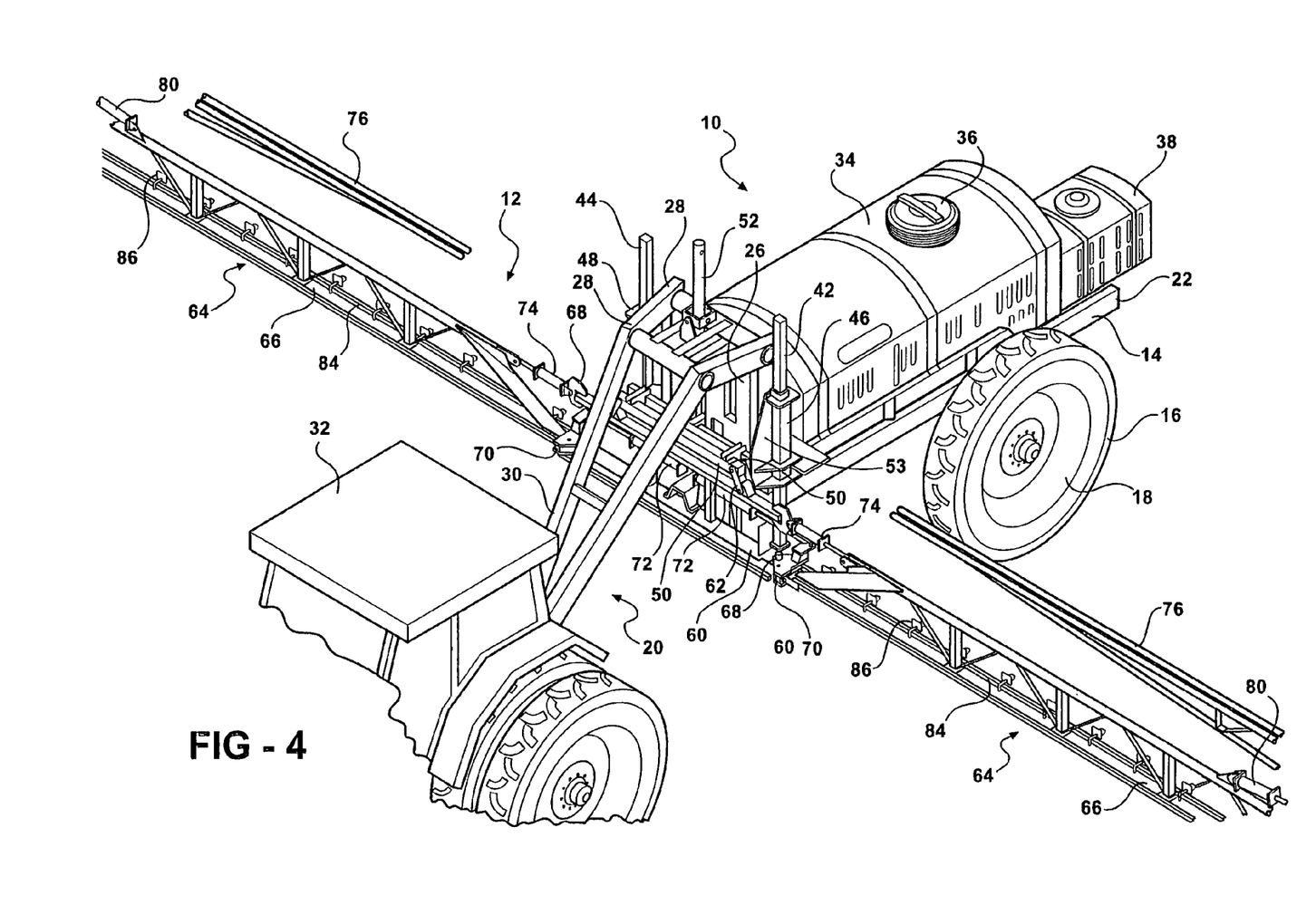
FIG. 4 is an enlarged view identical to FIG. 2 with parts broken away.
Figure 5:
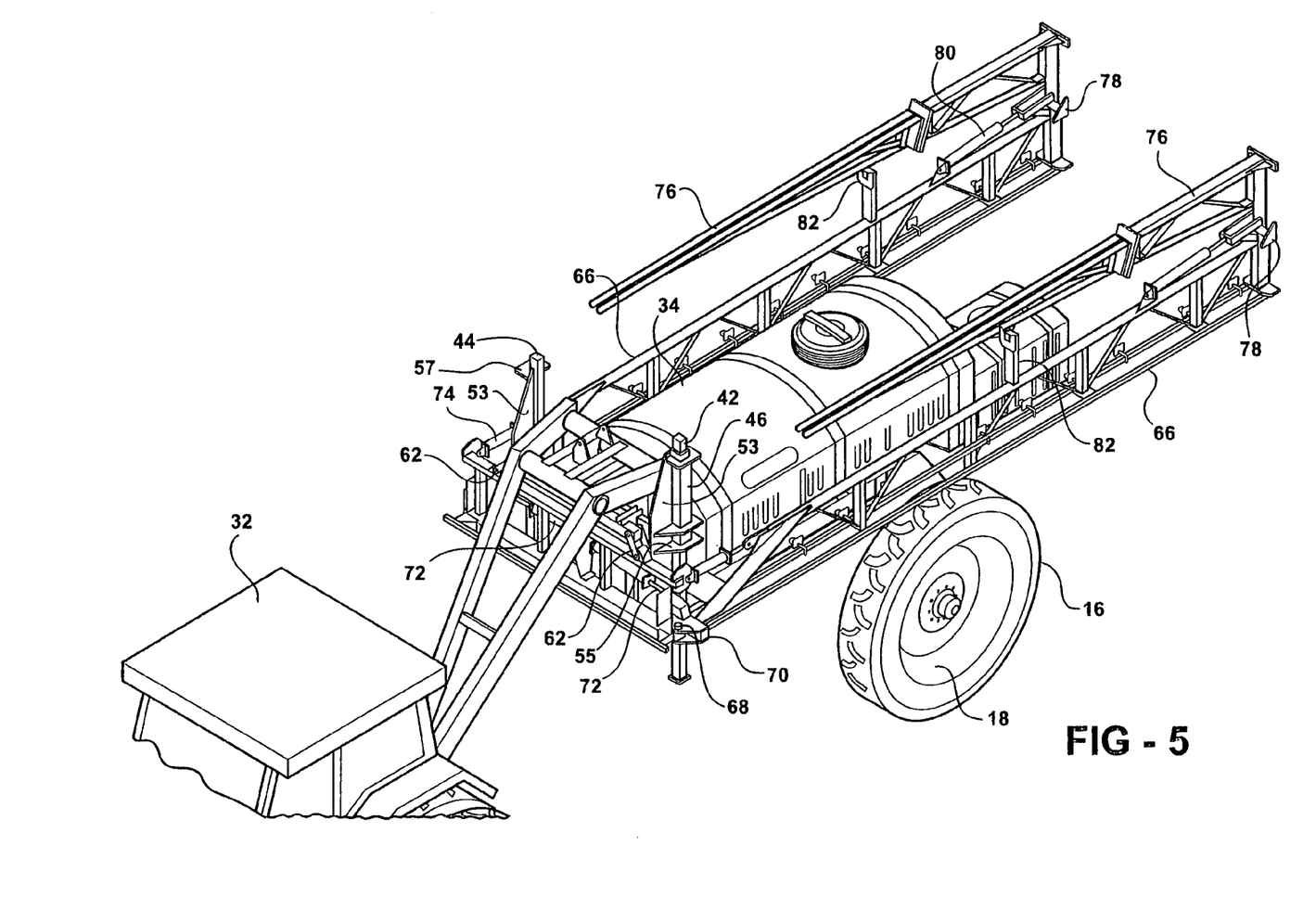
FIG. 5 is a an enlarged view identical to FIG. 3 with parts broken away and the wing assemblies in a folded transport position.
Figure 6:
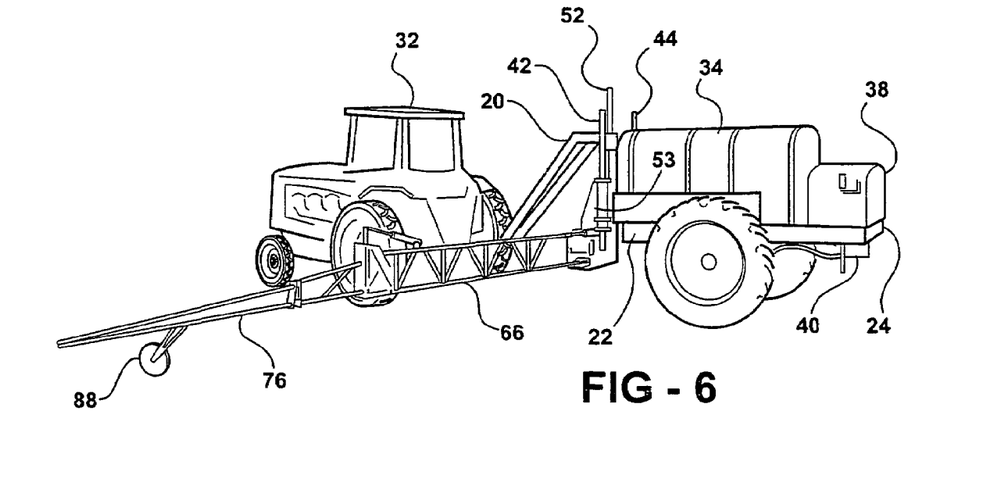
FIG. 6 is a reduced perspective view of the sprayer trailer with a front mounted boom in a working position.
Figure 7:
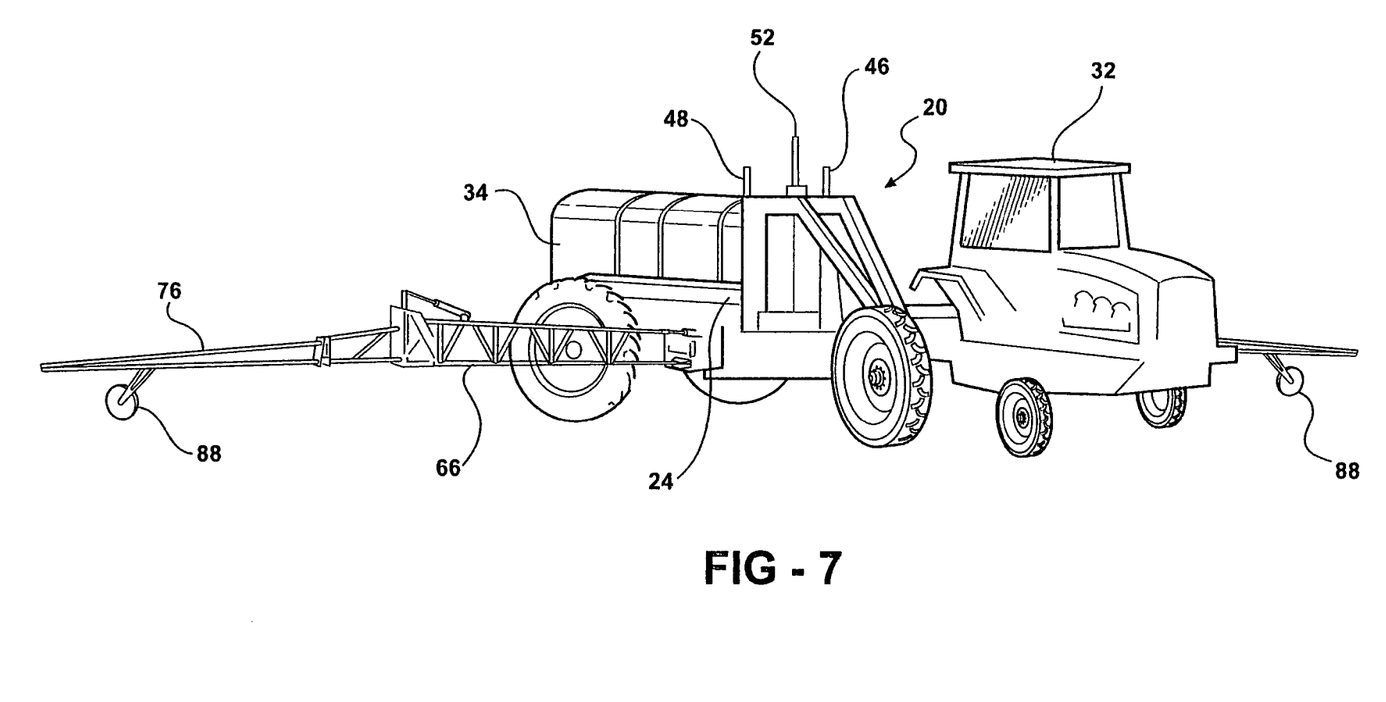
FIG. 7 is a perspective view of the right side of the sprayer trailer with the front mounted boom in a working position.
Figure 8:
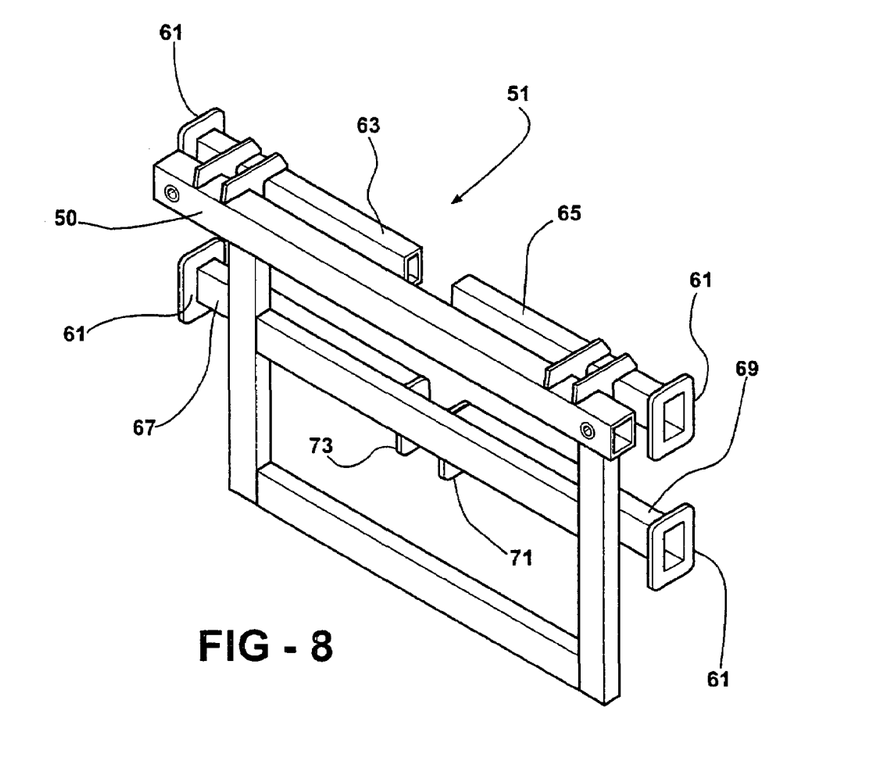
FIG. 8 is an enlarged perspective view of the central carrier.

Two spaced apart square vertical guide tubes 42 and 44 are mounted on the vertical mast 26 in positions outboard from the vertical mast. A channel member 46 is slideably mounted in the guide tube 42. The inboard side of the channel member 46 is open to permit the channel member to slide relative to the fixed tube 42 between a position adjacent to the bottom of the tube and a position adjacent to the top of the fixed tube. A second channel member 48 is slideably mounted in the vertical guide tube 44. The inboard side of the channel member 48, facing toward the channel member 46, is open to permit the channel member to slide relative to the fixed tube 44 substantially the vertical length of the fixed tube. A central carrier 51 shown in FIG. 8, has its lateral ends attached to plates 53 by bolts. The bolts pass through flanges 61 on the outboard ends of tubes 63, 65, 67 and 69. The left side plate 53 has its rear edge welded to the channel member 46 and extends forward from the channel member 46. The right side plate 53 has its rear edge welded to the channel member 48 and extends forward from the channel member. Three horizontal plates 55 are welded to the channel member 46 and to the left side plate 53 to reinforce the channel member 46. Three horizontal plates 57 (only one shown) are welded to the channel member 48 and to the right side plate to reinforce the channel member. The boom support frame 50 is welded to the central carrier 51. A space is provided between the inboard ends of tubes 63 and 65 for the hydraulic lift cylinder 52. The ram of the lift cylinder 52 is pivotally attached to the central carrier by a shaft that passes through the plates 71 and 73. Plate 71 is welded to the inboard end of tube 69. Plate 73 is welded to the inboard end of tube 67. A hydraulic lift cylinder 52 is connected to the boom central carrier 51 and is pivotally connected to the horizontal frame portion 28 of the hitch assembly. The pivotal connection between the cylinder 52 and the horizontal frame 28 includes fore and aft and transverse horizontal axes. The hydraulic linear actuator 52 is activated by a hydraulic pump and valve block on the tractor 32 to raise and lower the boom support frame 50 guided by the channel members 46 and 48.

The spray boom 12 includes a center section 60 that is pivotally attached to the boom support frame 50 by two sets of pivot links 62. Each left and right wing assembly 64 include an inner wing section 66 that is pivotally attached to the center section 60 by a vertical pivot pin 68 and a horizontal pivot pin 70. A hydraulic cylinder 72 pivots the inner wing section 66 about the pivot pin 68. A hydraulic cylinder 74 pivots the inner wing section 66 about the horizontal pivot pin 70.

An outer wing 76 is pivotally attached to the free end of each inner wing by a pivot pin 78. Hydraulic cylinders 80 are provided to pivot the outer wing 76 relative to the inner wing. Boom rests 82 limit folding of the outer boom 76 relative to the inner boom 66. Fluid pipes 84 and nozzles 86 are attached to the boom sections. The pipes 84 carry fluid from the pump and control valve 40 to the nozzles 86.

Wheels 88 are mounted on the outer wing 76 to prevent contact between the sprayer boom 12 and the ground.

The hitch assembly 20 permits the sprayer boom 12 to be positioned a few inches above the ground or above the top of corn plants, for example, that are approaching four feet (4') tall. Generally the nozzles 86 need to be several inches above the ground to obtain spray patterns that overlap. Most farm tractors cannot pass through a field with plants that are four feet (4') tall without causing substantial crop damage. It should be noted, however, that with a boom that is sixty feet (60') long or so it may be acceptable to provide special passages through a field for tractor wheels and tractors.

We claim:

1. A sprayer trailer comprising:
   a generally horizontal frame with a frame front end and a frame rear end;
   a pair of wheels and tires connected to and supporting the generally horizontal trailer frame;
   a hitch assembly including a generally vertical rear mast with a rear mast lower end fixed to the frame front end and extending upwardly from the frame front end to a generally vertical rear mast top end, a hitch assembly forward mast with a front mast top end that is forward of the generally vertical rear mast top end, a hitch connector assembly portion fixed to a front mast lower end, and a hitch assembly generally horizontal frame portion fixed to the generally vertical rear mast top end and to the front mast top end;
   a boom support frame slidably mounted on the hitch assembly and the generally horizontal trailer frame for generally vertical movement relative to the generally horizontal trailer frame, and a linear actuator connected to the boom support frame and the hitch assembly and operable to move the boom support frame up and down;
   a boom center section mounted on the boom support frame and moveable, with the boom support frame, from a lowered boom position and a raised position between the generally vertical rear mast and the hitch assembly forward mast.

2. A sprayer trailer, as set forth in claim 1, including a pair of generally vertical guide members fixed to the generally vertical rear mast and wherein the boom support frame is slidably mounted on the pair of generally vertical guide members.

3. A sprayer trailer, as set forth in claim 2, wherein the boom support frame includes a left boom channel member which receives one of the pair of generally vertical guide members and a right boom channel member which receives the other one of the pair of generally vertical guide members.

4. A sprayer trailer, as set forth in claim 1, including a left boom wing assembly pivotally connected to a boom center section left end and a right boom wing assembly pivotally connected to a boom center section right end.

5. A sprayer trailer, as set forth in claim 4, wherein the pivotal connection between the boom center section and the left boom wing has a left vertical axis, the pivotal connection between the boom center section and the right boom wing has a right vertical axis, and wherein the left boom wing assembly and the right boom wing assembly both pivot to a transport position extending rearward from the boom center section.

6. A sprayer trailer, as set forth in claim 1, including a spray fluid storage tank mounted on the generally horizontal frame to the rear of the hitch assembly;
   a fluid pipe mounted on the boom center section, and a plurality of horizontally spaced nozzles connected to the fluid pipe; and
   a pump and fluid control valve mounted on the generally horizontal frame, connected the spray fluid storage tank by a pump intake line and to said fluid pipe by a pump discharge line, and wherein the pump and fluid control value meter spray fluid from the spray fluid storage tank and deliver spray fluid through the fluid pipe mounted on the boom center section to the plurality of horizontally spaced nozzles.

7. A sprayer trailer, as set forth in claim 6, wherein the linear actuator connected to the boom support frame and to the hitch assembly selective moves the center boom section between lower selected positions with the plurality of horizontally spaced nozzles below the generally horizontal frame and selected positions with the plurality of horizontally spaced nozzles above the generally horizontal frame.

8. A sprayer trailer comprising:
   a trailer frame with a frame front end and a frame rear end;
   a pair of wheels connected to and supporting the trailer frame;
   a hitch assembly including a rear mast connected to the trailer frame and having a rear mast top end and a rear mast lower end, a front mast with a front mast top end connected to the rear mast top end and a hitch connector assembly portion mounted on a front mast lower end;
   a vertical guide assembly mounted on the hitch assembly;
   a boom support frame slidably mounted on the vertical guide assembly and a linear actuator connected to the boom support frame and hitch assembly for sliding the boom support frame up and down on the vertical guide assembly;
   a sprayer boom center section supported by the boom support frame;
   a plurality of horizontally spaced nozzles supported by the sprayer boom center section and movable vertically with the sprayer boom center section between a lower nozzle position that is lower than the rear mast lower end and a raised nozzle position that is above rear mast lower end;
   a left wing boom pivotally attached to a center boom left end of the sprayer boom center section; and
   a right wing boom pivotally attached to a center boom right end of the sprayer boom center section.

* * * * *